(12) United States Patent
Sporrer et al.

(10) Patent No.: US 10,925,204 B2
(45) Date of Patent: *Feb. 23, 2021

(54) HYDRAULIC CONTROL SYSTEM OF AN IMPLEMENT FOR A WORK MACHINE AND METHOD THEREOF

(71) Applicant: DEERE & COMPANY, Moline, IL (US)

(72) Inventors: Adam D. Sporrer, Ankeny, IA (US); Jarrod R. Ruckle, Bondurant, IA (US)

(73) Assignee: DEERE & COMPANY, Moline, IL (US)

( * ) Notice: Subject to any disclaimer, the term of this patent is extended or adjusted under 35 U.S.C. 154(b) by 352 days.

This patent is subject to a terminal disclaimer.

(21) Appl. No.: 15/972,310

(22) Filed: May 7, 2018

(65) Prior Publication Data

US 2018/0249622 A1 Sep. 6, 2018

Related U.S. Application Data

(63) Continuation of application No. 15/058,745, filed on Mar. 2, 2016, now Pat. No. 9,961,823.

(51) Int. Cl.
*A01B 63/32* (2006.01)
*A01B 63/22* (2006.01)
*A01B 63/00* (2006.01)
*A01B 79/00* (2006.01)

(52) U.S. Cl.
CPC ............ *A01B 63/32* (2013.01); *A01B 63/008* (2013.01); *A01B 63/22* (2013.01); *A01B 79/00* (2013.01)

(58) Field of Classification Search
CPC ........ A01B 63/008; A01B 63/22; A01B 63/32
USPC ....................................... 172/4, 4.5
See application file for complete search history.

(56) References Cited

U.S. PATENT DOCUMENTS

| 4,129,258 | A | 12/1978 | Mott et al. |
| 4,821,806 | A | 4/1989 | Winter |
| 6,305,478 | B1 | 10/2001 | Friggstad |
| 8,573,319 | B1 * | 11/2013 | Casper ................. A01B 63/114 172/4 |
| 8,657,023 | B2 * | 2/2014 | Casper ................. A01B 63/111 172/4 |
| 9,609,800 | B2 * | 4/2017 | Henry ..................... A01B 51/04 |
| 9,615,499 | B2 * | 4/2017 | Kowalchuk ............ A01B 63/22 |
| 9,648,799 | B2 * | 5/2017 | Ohnsat ................... A01B 21/08 |
| 9,961,823 | B2 * | 5/2018 | Sporrer .................. A01B 79/00 |

(Continued)

*Primary Examiner* — Gary S Hartmann
(74) *Attorney, Agent, or Firm* — Taft Stettinius & Hollister LLP; Stephen F. Rost

(57) ABSTRACT

An agricultural implement includes a transversely extending frame forming a first, a second, and a third frame section. A hydraulic control system controls a raising or lowering movement of each frame section. A first actuator and a second actuator are coupled to the first frame section, a third actuator is coupled to the second frame section, and a fourth actuator is coupled to the third frame section. A first control valve is fluidly coupled between a fluid source and the first and second actuators. A second control valve is fluidly coupled to the third actuator and a third control valve is fluidly coupled to the fourth actuator. A first flow path fluidly couples the first actuator, the second actuator, the third actuator, and the fourth actuator in series and a second flow path fluidly couples at least the third and fourth actuators in parallel with one another.

18 Claims, 6 Drawing Sheets

(56) References Cited

U.S. PATENT DOCUMENTS

| | | | |
|---|---|---|---|
| 10,440,876 B2* | 10/2019 | Sporrer | A01B 5/04 |
| 10,667,454 B2* | 6/2020 | Sporrer | A01B 63/111 |
| 2015/0156949 A1 | 6/2015 | Henry | |
| 2018/0153088 A1* | 6/2018 | Sporrer | A01B 49/065 |

* cited by examiner

Primary Action Desired
Valve Action

| Action Required | ROW | RIW | RMF LMF | LIW | LOW |
|---|---|---|---|---|---|
| Raise Overall | C | C | O | C | C |
| Lower Overall | C | C | O | C | C |
| Raise MF | C | C | O | C | C |
| Lower MF | C | C | O | C | C |
| Raise LIW | C | C | C | O | C |
| Lower LIW | C | C | C | O | C |
| Raise LOW | C | C | C | C | O |
| Lower LOW | C | C | C | C | O |
| Raise RIW | C | O | C | C | C |
| Lower RIW | C | O | C | C | C |
| Raise ROW | O | C | C | C | C |
| Lower ROW | O | C | C | C | C |

Cylinder Action

| Action Required | ROW | RIW | RMF LMF | LIW | LOW |
|---|---|---|---|---|---|
| Raise Overall | E | E | E | E | E |
| Lower Overall | R | R | R | R | R |
| Raise MF | E | E | E | E | E |
| Lower MF | R | R | R | R | R |
| Raise LIW | - | - | - | E | E |
| Lower LIW | - | - | - | R | R |
| Raise LOW | - | - | - | - | E |
| Lower LOW | - | - | - | - | R |
| Raise RIW | E | E | - | - | - |
| Lower RIW | R | R | - | - | - |
| Raise ROW | E | - | - | - | - |
| Lower ROW | R | - | - | - | - |

Fig. 4

HYDRAULIC CONTROL SYSTEM OF AN IMPLEMENT FOR A WORK MACHINE AND METHOD THEREOF

RELATED APPLICATIONS

This application is a continuation of U.S. patent application Ser. No. 15/058,745, filed Mar. 2, 2016, which is hereby incorporated by reference in its entirety.

FIELD OF THE DISCLOSURE

The present disclosure relates to a hydraulic control system, and in particular to a hydraulic control system of an implement of a work machine.

BACKGROUND OF THE DISCLOSURE

In the agricultural industry, wide implements such as field cultivators and the like include a main frame and adjacent outrigger or wing frames that are hinged or pivotably coupled thereto. Each frame includes at least one hydraulic actuator for raising or lowering the respective frame for proper depth control of tools. Conventional depth control systems utilize parallel or series hydraulic control. With series-only control, it can be difficult to provide individual depth control of each frame section independently of the other frame sections. With parallel-only control, more hydraulic flow is often required for raising and lowering individual frame sections. Moreover, it can take longer to raise or lower the individual frame section with parallel-only flow.

In the present disclosure, a hydraulic depth control system is described and illustrated for providing individual depth control of each frame section independently of the other frame sections and raise or lower each frame section more quickly than conventional parallel-only control systems.

SUMMARY

In one embodiment of the present disclosure, an agricultural implement includes a transversely extending frame forming at least a first frame section, a second frame section, and a third frame section, where the first frame section is disposed between the second and third frame sections; a hitch member configured to couple to a work machine, the hitch member being coupled to at least one of the first, second, and third frame sections; and a hydraulic control system for controlling a raising or lowering movement of the frame, the system including a first actuator and a second actuator coupled to the first frame section, a third actuator coupled to the second frame section, and a fourth actuator coupled to the third frame section; a fluid source for providing hydraulic fluid; a first control valve operably controllable between an open position and a closed position, the first control valve being fluidly coupled between the fluid source and the first and second actuators; a second control valve operably controllable between an open position and a closed position, the second control valve being fluidly coupled to the third actuator in its open position; a third control valve operably controllable between an open position and a closed position, the third control valve being fluidly coupled to the fourth actuator in its open position; a first flow path defined between the fluid source and the third and fourth actuators, the first flow path fluidly coupling the first actuator, the second actuator, the third actuator, and the fourth actuator in series with one another when the first control valve is in its open position, the second control valve is in its closed position, and the third control valve is in its closed position; and a second flow path defined between the fluid source and the third and fourth actuators, the second flow path fluidly coupling at least the third and fourth actuators in parallel with one another when the first control valve is in its closed position, and either the second control valve or the third control valve is in its open position.

In one example of this embodiment, the implement may include a fluid reservoir; and a third flow path fluidly coupling the third actuator and the fourth actuator to the fluid reservoir. In a second example, the hydraulic control system includes a first node fluidly coupling the first and second flow paths to one another; a second node fluidly coupling the first control valve, the first actuator and the second actuator to one another; a third node fluidly coupling the first fluid path, the second fluid path, the second control valve and the third actuator to one another; and a fourth node fluidly coupling the first fluid path, the second fluid path, the third control valve, and the fourth actuator to one another. In a third example, the first control valve is an electrohydraulic control valve biased in its open position, the second control valve is an electrohydraulic control valve biased in its closed position, and the third control valve is an electrohydraulic control valve biased in its closed position.

In a fourth example of this embodiment, an electronic control unit may be coupled to the frame for controlling the first, second and third control valves between their respective open and closed positions. In a fifth example, a first sensor is disposed in electrical communication with the electronic control unit, the first sensor detecting a position of the first frame section; a second sensor is disposed in electrical communication with the electronic control unit, the second sensor detecting a position of the second frame section; and a third sensor is disposed in electrical communication with the electronic control unit, the third sensor detecting a position of the third frame section. In a sixth example, each frame section includes a plurality of tools for penetrating a soil upon which the implement travels; wherein, each of the first, second, and third sensor operably detects a depth of penetration of the plurality of tools coupled to each frame section and communicates the detected depth to the electronic control unit, the electronic control unit compares the detected depth to a target depth and operably controls the position of each control valve until the depth of the plurality of tools on each frame section is at the target depth.

In a seventh example of this embodiment, when the depth of the plurality of tools coupled to the second frame section or the third frame section is not at the target depth, the electronic control unit operably controls fluid flow through the third or fourth actuator via the second flow path until the depth is detected at the target depth. In an eighth example, the agricultural implement may include a fourth frame section coupled to the second frame section, the fourth frame section including a fifth actuator for controlling a raising or lowering movement of the fourth frame section; a fifth frame section coupled to the third frame section, the fifth frame section including a sixth actuator for controlling a raising or lowering movement of the fifth frame section; a fourth control valve operably controllable between an open position and a closed position, the fourth control valve being fluidly coupled to the fifth actuator in its open position; and a fifth control valve operably controllable between an open position and a closed position, the fifth control valve being fluidly coupled to the sixth actuator in its open position; wherein, the first flow path fluidly couples the first, second, third, fourth, fifth, and sixth actuators in series with one another when only the first control valve is in its open position, and the second flow path fluidly couples the third, fourth, fifth, and sixth actuators in parallel with one another when the first control valve is in its closed position.

In another example of this embodiment, a plurality of tools is coupled to each frame section; and a plurality of sensors for detecting a depth at which the plurality of tools coupled to each frame section penetrates a soil upon which the implement travels along; wherein, when the depth of the plurality of tools coupled to either the second frame section or the third frame section is not at a target depth, the electronic control unit operably controls the first control valve to its closed position and either the second or third control valve to its open position so that hydraulic fluid from the fluid source flows through the second flow path to either the third or fourth actuator to raise or lower the second or third frame section until the depth of the first frame section, the second frame section and the third frame section are at the target depth. In a further example of this embodiment, once the depth of the second frame second or the third frame section is operably controlled to the target depth, the electronic control unit operably controls the first control valve to remain in its closed position, the second and third control valves are controlled to their respective closed positions, and either the fourth or fifth control valve is operably controlled to its open position so that hydraulic fluid from the fluid source flows through the second flow path to either the fifth or sixth actuator to raise or lower the fourth or fifth frame section until the depth of the first frame section, the second frame section, the third frame section, the fourth frame section, and the fifth frame section are at the target depth.

In another embodiment of the present disclosure, a work machine includes a frame; a controller for controlling the machine; a fluid source for providing hydraulic fluid; a work implement coupled to the frame for performing a work function, the work implementing including a transversely extending frame forming at least a first frame section, a second frame section, and a third frame section, where the first frame section is disposed between the second and third frame sections; a plurality of work tools coupled to each of the first, second, and third frame sections; an electronic control system for electronically controlling the implement, the electronic control system including an electronic control unit (ECU) and a plurality of sensors, where the ECU is disposed in communication with the controller and the plurality of sensors are configured to detect a depth of penetration of the plurality of work tools into a ground surface upon which the implement travels, each of the plurality of sensors disposed in electrical communication with the ECU; and a hydraulic control system for hydraulically controlling a raising or lowering movement of each frame section, the hydraulic control system including a first actuator coupled to the first frame section, a second actuator coupled to the second frame section, and a third actuator coupled to the third frame section; a first control valve operably controllable between an open position and a closed position, the first control valve being fluidly coupled between the fluid source and the first actuator; a second control valve operably controllable between an open position and a closed position, the second control valve being fluidly coupled to the second actuator in its open position; a third control valve operably controllable between an open position and a closed position, the third control valve being fluidly coupled to the third actuator in its open position; a first flow path defined between the fluid source and the second and third actuators, the first flow path fluidly coupling the first actuator, the second actuator, and the third actuator in series with one another when the first control valve is in its open position, the second control valve is in its closed position, and the third control valve is in its closed position; and a second flow path defined between the fluid source and the second and third actuators, the second flow path fluidly coupling at least the second and third actuators in parallel with one another when the first control valve is in its closed position, and either the second control valve or the third control valve is in its open position.

In one example of this embodiment, the work machine may include a fluid reservoir fluidly coupled to the fluid source; and a third flow path fluidly coupling the second actuator and the third actuator to the fluid reservoir. In another example, the implement may include a fourth frame section coupled to the second frame section, the fourth frame section including a fourth actuator for controlling a raising or lowering movement of the fourth frame section; and a fifth frame section coupled to the third frame section, the fifth frame section including a fifth actuator for controlling a raising or lowering movement of the fifth frame section; a fourth control valve operably controllable by the ECU between an open position and a closed position, the fourth control valve being fluidly coupled to the fourth actuator in its open position; and a fifth control valve operably controllable by the ECU between an open position and a closed position, the fifth control valve being fluidly coupled to the fifth actuator in its open position; wherein, the first flow path fluidly couples the first, second, third, fourth, and fifth actuators in series with one another when only the first control valve is in its open position, and the second flow path fluidly couples the second, third, fourth, and fifth actuators in parallel with one another when the first control valve is in its closed position.

In a further embodiment of the present disclosure, a method is provided for controlling an agricultural implement having a transversely extending frame forming a center frame section, a first frame section disposed on one side of the center frame section, and a second frame section disposed on an opposite side of the center frame section, the method including providing a fluid source, an electronic control unit, a first control valve, a second control valve, a third control valve, a first and a second actuator coupled to the center frame section, a third actuator coupled to the first frame section, a fourth actuator coupled to the second frame section, and a plurality of tools coupled to each frame section; providing a first fluid path and a second fluid path, the first fluid path fluidly coupling the first, second, third and fourth actuators in series when the first control valve is open, and the second fluid path fluidly coupling the third and fourth actuators in parallel with one another when the first control valve is closed; operating the agricultural implement in a working position, where in the working position each of the plurality of tools is disposed at a target depth in a ground surface upon which the implement travels; detecting a depth position of the plurality of tools coupled to the center frame section with a first sensor, a depth position of the plurality of tools coupled to the first frame section with a second sensor, and a depth position of the plurality of tools coupled to the second frame section with a third sensor; communicating the depth position of the plurality of tools to the electronic control unit; determining if the depth position of the plurality of tools is at the target depth; wherein, when the depth position of the plurality of tools coupled to the center frame section, the first frame section, or the second frame section is not at the target depth, the method further includes controllably opening the first control valve and closing the second and third control valves to raise or lower the center frame section until the depth of the plurality of tools coupled to the center frame section is at the target depth; and controllably closing the first control valve and opening the second or third control valve to raise or lower either the first or section frame section until the depth of the plurality of tools coupled to the first or second frame section is at the target depth.

In one example of this embodiment, the method may include controlling fluid flow through the first fluid path to raise or lower the center frame section, the first frame section and the second frame section. In a second example, the method may include controlling fluid flow through the first and second actuators to position the frame between a transport position and its working position. In a third example, the method may include controlling fluid flow through the second fluid path to control the depth of the plurality of tools coupled to one of the first or second frame sections; and blocking fluid flow through the first flow path to the first and second actuators.

In another example of this embodiment, the method may include providing a third frame section coupled to the first frame section, a fourth frame section coupled to the second frame section, a fourth control valve, a fifth control valve, a fifth actuator, and a sixth actuator, where the fifth actuator and sixth actuator are fluidly coupled in series to the first actuator, second actuator, third actuator and fourth actuator via the first flow path, and the fifth actuator and sixth actuator are fluidly coupled in parallel with the third actuator and the fourth actuator via the second flow path; providing a plurality of tools coupled to the third frame section and the fourth frame section; detecting the plurality of tools coupled to either the third frame section or the fourth frame section is not at the target depth; controllably closing the first control valve and the first flow path; controllably opening the fourth or the fifth control valve; and fluidly coupling the fluid source to the fifth or sixth actuator to raise or lower the third frame section or the fourth frame section until the plurality of tools coupled to the third frame section and fourth frame section are at the target depth.

In yet another example of this embodiment, the method may include providing a third frame section coupled to the first frame section, a fourth frame section coupled to the second frame section, a fourth control valve, a fifth control valve, a fifth actuator, and a sixth actuator, where the fifth actuator and sixth actuator are fluidly coupled in series to the first actuator, second actuator, third actuator and fourth actuator via the first flow path, and the fifth actuator and sixth actuator are fluidly coupled in parallel with the third actuator and the fourth actuator via the second flow path; providing a plurality of tools coupled to the third frame section and the fourth frame section; detecting the plurality of tools coupled to the first frame section or the second frame section is not at the target depth; controllably closing the first control valve; controllably opening the second control valve or the third control valve depending upon whether the depth of the plurality of tools coupled to the first or second frame sections is not at the target depth; fluidly coupling the fluid source to the third actuator or the fourth actuator to raise or lower the first or the second frame section until the plurality of tools coupled to the first and second frame sections are at the target depth; further detecting the depth of the plurality of tools coupled to either the third frame section or the fourth frame section is not at the target depth; controllably maintaining the first control valve in its closed position; controllably closing the second or third control valve; controllably opening the fourth or fifth control valve; and fluidly coupling the fluid source to the fifth or sixth actuator to raise or lower the third frame section or the fourth frame section until the plurality of tools coupled to the third frame section and fourth frame section are at the target depth.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 is a chart of valve and cylinder primary response for tool depth control;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
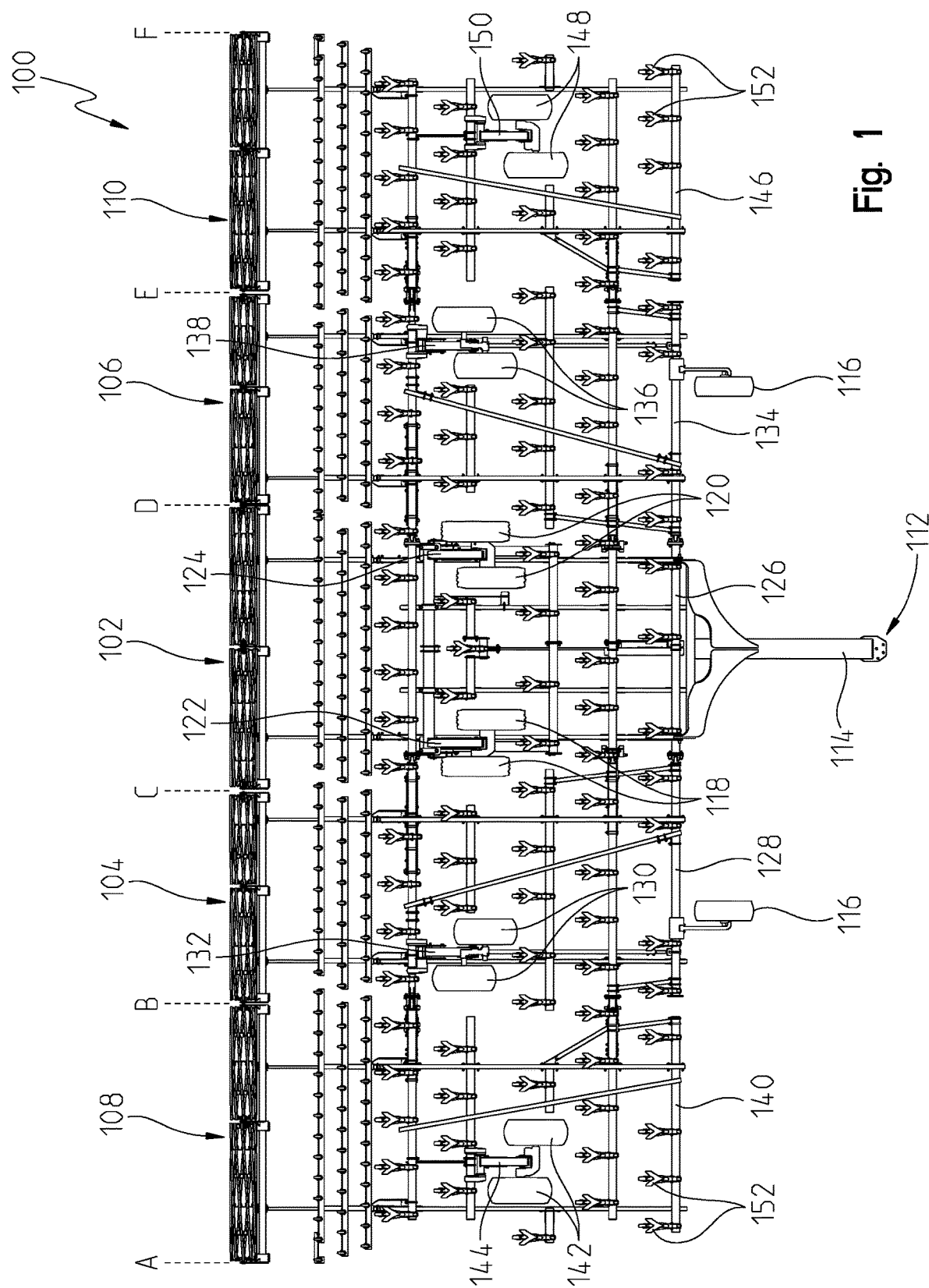
FIG. 1 is an elevated view of an agricultural implement.

Referring to FIG. 1, an agricultural implement 100 such as a field cultivator is shown. The implement 100 is designed to couple to a work machine and perform a work function. For example, the implement may include work tools that penetrate into soil for aerating the soil before planting or uprooting weeds after planting. The implement 100 may be attached to a work machine or tractor (not shown) by a hitch assembly 112 such as a three-point hitch or a drawbar attachment. The hitch assembly 112 includes a hitch frame member 114 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 112 as shown. A first frame section or first inner frame 104 is disposed to one side of the main frame 102, and a second frame section or second inner frame 106 is disposed to an opposite side thereof. In addition, a third frame section or first outer frame 108 is disposed to an outside of the first inner frame 104, and a fourth frame section or second outer frame 110 is disposed to an outside of the second inner frame 106. Each frame section may be pivotably coupled to the frame section adjacent thereto. The first inner frame 104, for example, may be pivotably coupled to the main frame 102 and the first outer frame 108. Similarly, the second inner frame 106 may be pivotably coupled to the main frame 102 and the second outer frame 110.

The implement 100 may be supported by a plurality of wheels. For example, a pair of front wheels 116 are coupled to the frame at a front end thereof. The main frame 102 may be supported by a first pair of wheels 118 and a second pair of wheels 120. The first inner frame 104 may be supported by a third pair of wheels 130 and the second inner frame 106 may be supported by a fourth pair of wheels 136. Likewise, the first outer frame 108 may be supported by a fifth pair of wheels 142 and the second outer frame 110 may be supported by a sixth pair of wheels 148. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include more than the front wheels 116. For instance, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, electric actuator, or any other known actuator. Moreover, each actuator may include an outer body or cylinder in which a rod or piston moves between an extended position and a retracted position. In FIG. 1, the main frame 102 includes a first actuator 122 and a second actuator 124. The first pair of wheels 118 may be coupled to the main frame 102 via a rock shaft (not shown) that may be hydraulically actuated by the first actuator 122. The second pair of wheels 120 may be coupled to the main frame 102 via another rock shaft (not shown) that may be hydraulically actuated by the second actuator 124. The actuators can raise or lower the main frame 102 relative to the wheels 118, 120, as will be described below.

The first inner frame 104 may include an actuator 132 for raising or lowering the first inner frame 104. Similarly, the second inner frame 106 may include an actuator 138 for controlling a raising or lowering movement of the second inner frame 104. The first outer frame 108 may include an actuator 144 and the second outer frame 110 may include an actuator 150. The actuator 144 may control raising and lowering of the first outer frame 108 and the actuator 150 may control raising and lowering of the second outer frame 110.

In FIG. 1, the main frame 102 includes a plurality of main frame members 126. A plurality of tools 152 may be coupled to the main frame members 126 for engaging a ground surface or soil upon which the implement travels. Similarly, the first inner frame 104 includes a plurality of first inner frame members 128, the second inner frame 106 includes a plurality of second inner frame members 134, the first outer frame 108 includes a plurality of first outer frame members 140, and the second outer frame 110 includes a plurality of second outer frame members 146. Each of these frame members may include a plurality of work tools 152 coupled thereto.

While FIG. 1 represents an illustrated embodiment of an agricultural implement with five frame sections, this disclosure is not limited to this embodiment. Other embodiments may include only three sections with a main frame and two outer frames. Alternatively, there may be more than five frame sections in further embodiments. Thus, this disclosure is not limited to any number of frame sections, and the teachings herein may be applicable to any multi-section implement.

Figure 2:
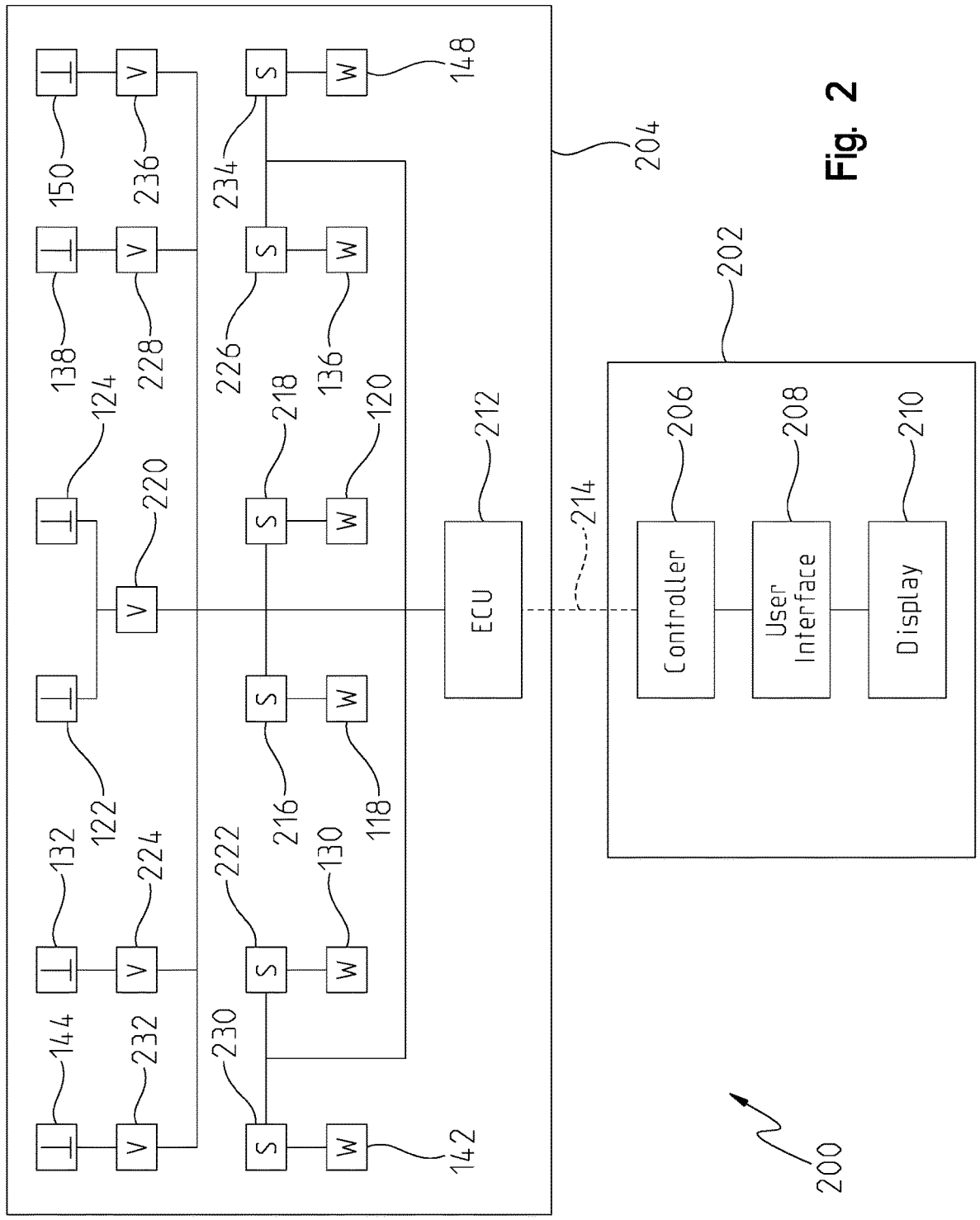
FIG. 2 is a diagram of an electronic control system of a work machine and the agricultural implement of FIG. 1.

Referring to FIG. 2, an electronic control system 200 is shown of an agricultural implement 204 similar to the one described above and shown in FIG. 1. Where applicable, reference numbers are repeated in FIG. 2 as first addressed above with reference to FIG. 1. In FIG. 2, a work machine 202 and the implement 204 are shown. The work machine 202 may include a frame or chassis 202 supported by a plurality of ground-engaging mechanisms (not shown) such as wheels. An operator's cab (not shown) may be mounted to the frame and an operator may control the work machine 202 therefrom. To do so, the work machine 202 may include a plurality of controls (not shown) such as joysticks, levers, switches, knobs, a steering wheel, pedals, and the like. A controller 206 may be electrically coupled to the plurality of controls, and the controller 206 may control the functionality of the work machine 202.

Moreover, a user interface 208 may be disposed in the operator's cab. The user interface 208 may include a display 210 for displaying various characteristics of the work machine such as, but not limited to, speed, fluid temperatures, fluid pressures, direction of travel, etc. The display 210 may be a touchscreen display that allows the operator to control certain functions of the machine 202 by touching a button on the display 210. Other uses of the user interface are available and this disclosure is not intended to be limited in any way with respect to the functionality of the operator controls or user interface 208.

The user interface 208 may also include controls for controlling the implement 204, such as movement of the frame or setting a tool depth. For example, the operator may desire to raise or lower the main frame 102 of the implement. To do so, the operator may input an instruction through the user display 208 which is received by the controller 206. The controller 206 may communicate with an electronic control unit (ECU) 212 of the implement 204 via a wireless or control area network (CAN) 214. A CAN is a vehicle bus standard designed to allow microcomputers and other electronic devices to communicate electronically with each other in applications without a host computer. Here, the machine controller 206 may send an instruction to the implement ECU 212 to raise or lower the main frame 102. As will be described, the ECU 212 may be programmed to execute this instruction and raise or lower the main frame 102 or any other frame section of the implement.

Referring to FIGS. 1 and 2, the ECU 212 may be in electrical communication with a plurality of sensors (e.g., rotary, Hall Effect) that are disposed at various locations on the implement 204. For instance, a first sensor 216 may be disposed at a location on the main frame 102 for detecting rotation of the rock shaft (not shown) which is connected to the first pair of wheels 118. A second sensor 218 may be disposed at a location on the main frame 102 for detecting rotation of the rock shaft connected to the second pair of wheels 120. Each sensor may be a rotary sensor, a Hall Effect sensor, or any other type of sensor. In addition, the first and second sensors may detect rotation of the rock shafts and communicate accordingly to the ECU 212. The ECU in turn can adjust or set the height of the main frame 102.

For example, a height of the wheels can be used to set a frame height. As described above, a plurality of ground-engaging work tools 152 may be coupled to the main frame 102. By controlling or actuating the first actuator 122 and the second actuator 124, the height of the main frame 102 can change for setting a depth of the work tools 152 into a ground surface or soil upon which the implement 100 travels. The first sensor 216 and the second sensor 218 may be positioned appropriately to detect rotation of the rock shaft. As the rock shaft rotates, the actuator extends or retracts. The ECU 212 may be programmed such that when the first actuator 122 and second actuator 124 are fully extended the main frame height is at a first height, and when the actuators are fully retracted the main frame height is at a second height. As the actuator cylinders extend and retract, the first pair of wheels 118 and second pair of wheels 120 can be raised or lowered, thereby adjusting the height of the main frame 102.

Besides the sensors on the main frame, a third sensor 222 may be disposed on the first inner frame 104 and detect a height of the third pair of wheels 130. A fourth sensor 226 may be disposed on or near the second inner frame 106 for detecting a height of the fourth pair of wheels 136. A fifth sensor 230 may be disposed on or near the first outer frame 108 for detecting a height of the fifth pair of wheels 142. Likewise, a sixth sensor 234 may be disposed on or near the second outer frame 110 for detecting a height of the sixth pair of wheels 148. Each of the third, fourth, fifth, and sixth sensors may be in electrical communication with the ECU 212. Moreover, while six different sensors are shown in FIG. 2, the present disclosure is not limited to six sensors. Other embodiments may include additional sensors for detecting and setting frame height. For those embodiments with fewer frame sections, there may be fewer sensors. Each sensor detects a position of wheels on each frame section, and thus the number of sensors may depend on the number of frame sections of a multi-section implement.

Figure 3:
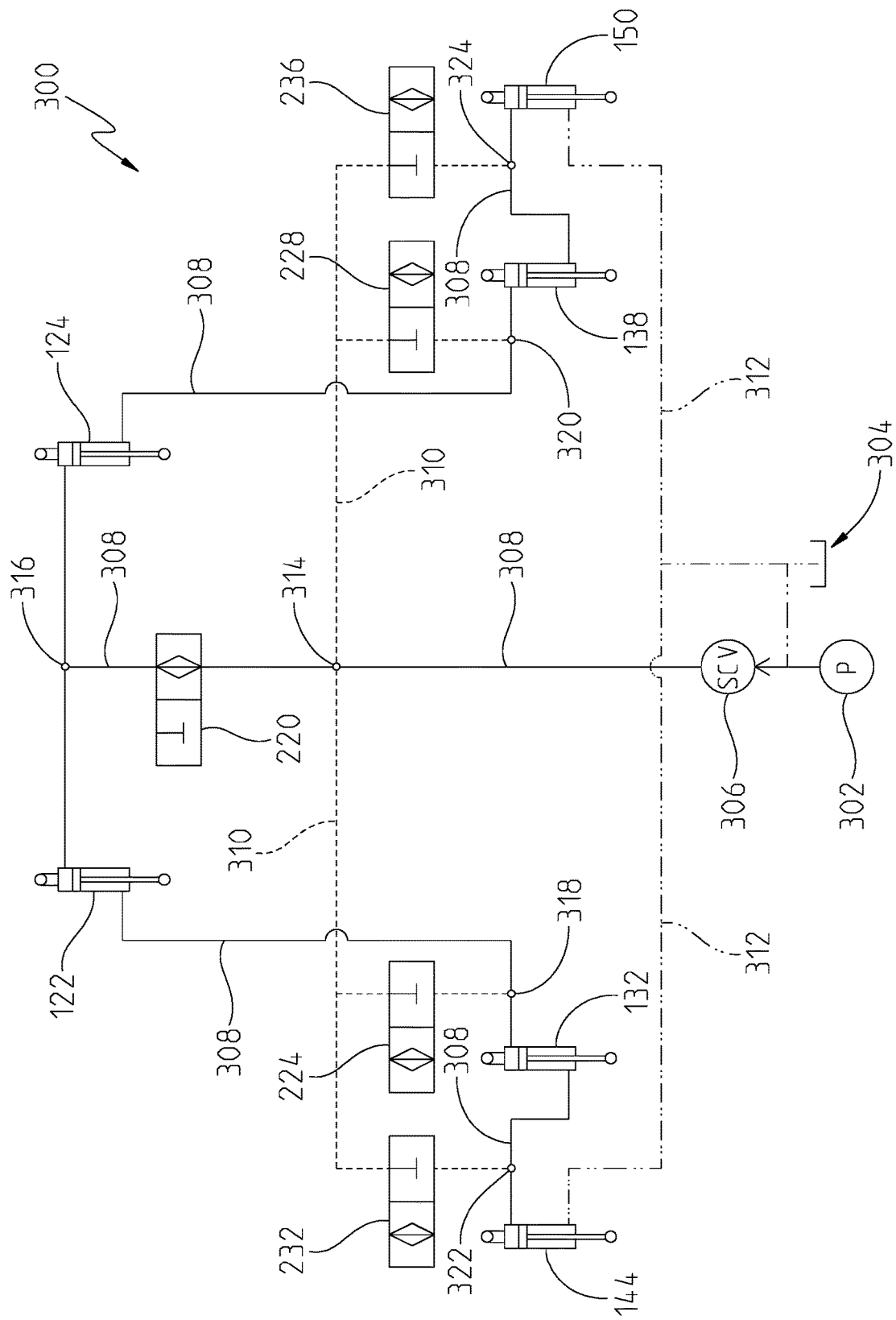
FIG. 3 is a diagram of a hydraulic control system of the work machine and agricultural implement of FIG. 2.

Referring to FIGS. 2 and 3, the implement 204 may also include a plurality of control valves for controlling movement of the overall frame and each independent frame section. As shown, a first control valve 220 may be in electrical communication with the ECU 212. The first control valve 220 may be used for adjusting the height of the overall frame or only the main frame 102. A second control valve 224 may be in electrical communication with the ECU 212 for controlling a raising or lowering movement of the first inner frame 104. A third control valve 228 may be in electrical communication with the ECU 212 for controlling a raising or lowering movement of the second inner frame 106. A fourth control valve 232 may be in electrical communication with the ECU 212 for controlling a raising or lowering movement of the first outer frame 108. Moreover, a fifth control valve 236 may be in electrical communication with the ECU 212 for controlling a raising or lowering movement of the second outer frame 110.

Each of the aforementioned control valves may be an electrohydraulic control valve that is capable of moving between an open position and a closed position. Each valve may include a solenoid (not shown) that is energized by an electrical current or signal sent by the ECU 212 to induce movement of the valve between the open and closed positions. The movement of the control valves can adjust fluid flow to the different actuators for controlling movement of the overall frame or each individual frame section, as will be described below.

Among other things, the present disclosure provides details of a hydraulic control system for achieving depth control of work tools and controlling movement of a multi-section frame of an agricultural implement. With multi-section frame implements such as the one shown in FIG. 1, it is desirable to achieve uniform tool depth along each section. Each section may have different tolerances or there may be a small leak in the actuator that controls movement of an individual frame section. In either case, it can be difficult to achieve uniform depth across each frame section and therefore the implement can utilize its hydraulic control system (and other control systems) to monitor and maintain uniform depth control.

In conventional hydraulic control systems, the two most common types of depth control systems are series hydraulic control and parallel hydraulic control. A series hydraulic control is typically a pure mechanical system without any electronic control. Here, hydraulic fluid is supplied from a fluid source to a first or master actuator or cylinder. The master cylinder receives the full amount of fluid flow, and as the master cylinder is actuated, fluid is displaced from the master cylinder and flows to the next-in-line actuator or cylinder. In this system, each actuator or cylinder is fluidly connected to one another in a series which allows for each cylinder to quickly receive fluid from the fluid source.

The series hydraulic control is ideal when it is necessary to raise the entire implement frame. However, it is not as desirable when only one frame section needs to be raised or lowered. As a result, some implements utilize the parallel hydraulic control. The parallel hydraulic control can include electronic control unlike the series hydraulic control. In this type of control, valves are utilized to control how fluid flows through the system. Fluid flows across each section in an equal amount so that fluid is available at each wheel to adjust a frame section height. The fluid source, however, only has a limited amount of fluid. Thus, when an operator wants to raise or lower a certain frame section, the parallel hydraulic control is capable of providing fluid to the actuator at that section but it may take much longer than in a series hydraulic control. It therefore can take longer to raise or lower a frame section, which can delay the operator from performing a desired function or operation. A slower system response is often the result with a depth control system consisting of conventional parallel hydraulic control.

Referring to FIG. 3, the present disclosure provides a different type of depth control system for the implement 204. Here, a combination of the series hydraulic control and parallel hydraulic control form a hybrid parallel-series hydraulic depth control system 300. In this system 300, additional hydraulics is added to obtain the benefits of both the series and parallel control while eliminating or reducing the problems associated with each. In FIG. 3, a fluid source 302 provides hydraulic fluid to the system 300. The fluid source 302 may be located on the work machine or tractor 202, and a hydraulic pump may supply the fluid to the implement. A fluid reservoir or tank 304 may also be provided for fluid to return from the implement 204. The fluid source 302 and fluid reservoir 304 may be fluidly coupled to one another.

The work machine or tractor 202 may also include a selective control valve 306 that is fluidly coupled to the fluid source 302. The valve 306 may be any type of valve that selectively allows fluid to flow from the work machine 202 to the implement 204. The valve 306 may be an electrohydraulic control valve that is controlled by the machine controller 206. For example, the controller 206 may be programmed to selectively open and close the control valve 206. If the work machine 202 requires additional hydraulic fluid to perform an operation, the controller 206 may close the valve 306 and not permit fluid to flow to the implement 204. In one embodiment, the selective control valve 306 may be biased to its open position and thus may be referred to as a normally open control valve. In another embodiment, the valve 306 may be biased to its closed position and thus be referred to as a normally closed valve.

In any event, hydraulic fluid may be supplied by the fluid source 302 through the control valve 306 and to the implement 204 via a first flow path 308 or pressure line. The first flow path 308 may be defined such that is passes through the first control valve 220 and to each of the first actuator 122 and second actuator 124. Moreover, when the first or second actuator is actuated, fluid displacement may result in fluid flowing through the first flow path to either the third actuator 132 or fourth actuator 138. Similarly, when either the third or fourth actuator are actuated, the fluid displacement in the actuator may allow fluid to flow to the fifth actuator 144 or sixth actuator 150 via the first flow path 308. In this embodiment, the first flow path 308 forms a series hydraulic control in which each actuator is fluidly coupled to one another in series. This can allow an operator to raise or lower the entire frame of the implement 204, or raise or lower the main frame 102.

In the first fluid path 308 or pressure line, the first control valve 220 may be biased in its open position. In this embodiment, the first control valve 220 is a normally open electrohydraulic control valve and thus hydraulic fluid can flow via the first fluid path 308 through the first control valve 220 without requiring any interaction by the ECU 212. This again is similar to the series hydraulic control described above. In this disclosure, however, it is appreciated that in other embodiments, the first control valve 220 may be a normally closed electrohydraulic control valve. In these other embodiments therefore the ECU 212 may be required to actuate or trigger the valve to its open position. In a further embodiment, the first control valve 220 may not be controlled by the ECU 212 or biased in either an open or closed position, but rather pressure acting on either side of the valve may actuate it between an open and closed position. Thus, different types of valves may be used in the embodiments described herein.

To control depth of the plurality of work tools 152, a second fluid path 310 or pressure line may be provided. A node 314 may be provided where the first and second fluid paths intersect. The node 314 may be a manifold or T that allows fluid to flow through both lines. Thus, fluid can flow from the fluid source 302 through the first fluid path 308 and the second fluid path 310. As shown in FIG. 3, however, the second control valve 224, the third control valve 228, the fourth control valve 232, and the fifth control valve 236 may be biased in their closed positions. Thus, fluid flowing through the second flow path is unable to flow through these other control valves until the ECU 212 selectively opens one of the control valves. If the ECU 212 selectively opens the second control valve 224, for example, then fluid can flow through the valve 224 via the second flow path 310 and reach the third actuator 132. In doing so, the third actuator 132 may be controllably actuated to raise or lower the first inner frame 104 to adjust the depth of its plurality of work tools 152.

Similar to the first control valve 220 described above, this disclosure is not intended to limit the different control valves to any particular biased position. Thus, the second control valve 224, the third control valve 228, the fourth control valve 232, and the fifth control valve 236 may be biased or pre-disposed in a normally open position or a normally closed position. Alternatively, these control valves may be actuated by fluid pressure acting on either side of each respective valve, thereby not requiring intervention by the ECU 212. Other embodiments that incorporate any type of valve may be used to achieve the operation of the control system 300.

The control system 300 may also include a third fluid path 312 or return pressure line. Each actuator may be designed to include at least two different fluid ports. One port may be disposed on a base side of the actuator and the other port may be disposed on a rod side of the actuator. The third fluid path 312 is fluidly coupled to the fluid reservoir 304, the fifth actuator 144, and the sixth actuator 150. Any fluid that flows through the first and second flow paths can therefore be returned to the reservoir 304 via the third flow path 312. As a result, a combination of the first and third flow paths and the second and third flow paths can define a closed-loop hydraulic circuit.

As previously described, the first control valve 220 does not require any electronic intervention or control by the ECU 212 to permit fluid flow through the series portion of the system 300. On the other hand, the second control valve 224, the third control valve 228, the fourth control valve 232, and the fifth control valve 236 are electrically controlled by the ECU 212 to permit fluid flow through the parallel portion of the system 300. When an operator commands a raising or lowering movement of an individual frame section, the ECU 212 may command the first control valve 220 to its closed position and open one of the normally-closed valves to allow fluid flow through the second flow path 310 to the appropriate actuator for raising or lowering the desired frame section. This type of control will be described with reference to FIGS. 4 and 5.

Figure 5:
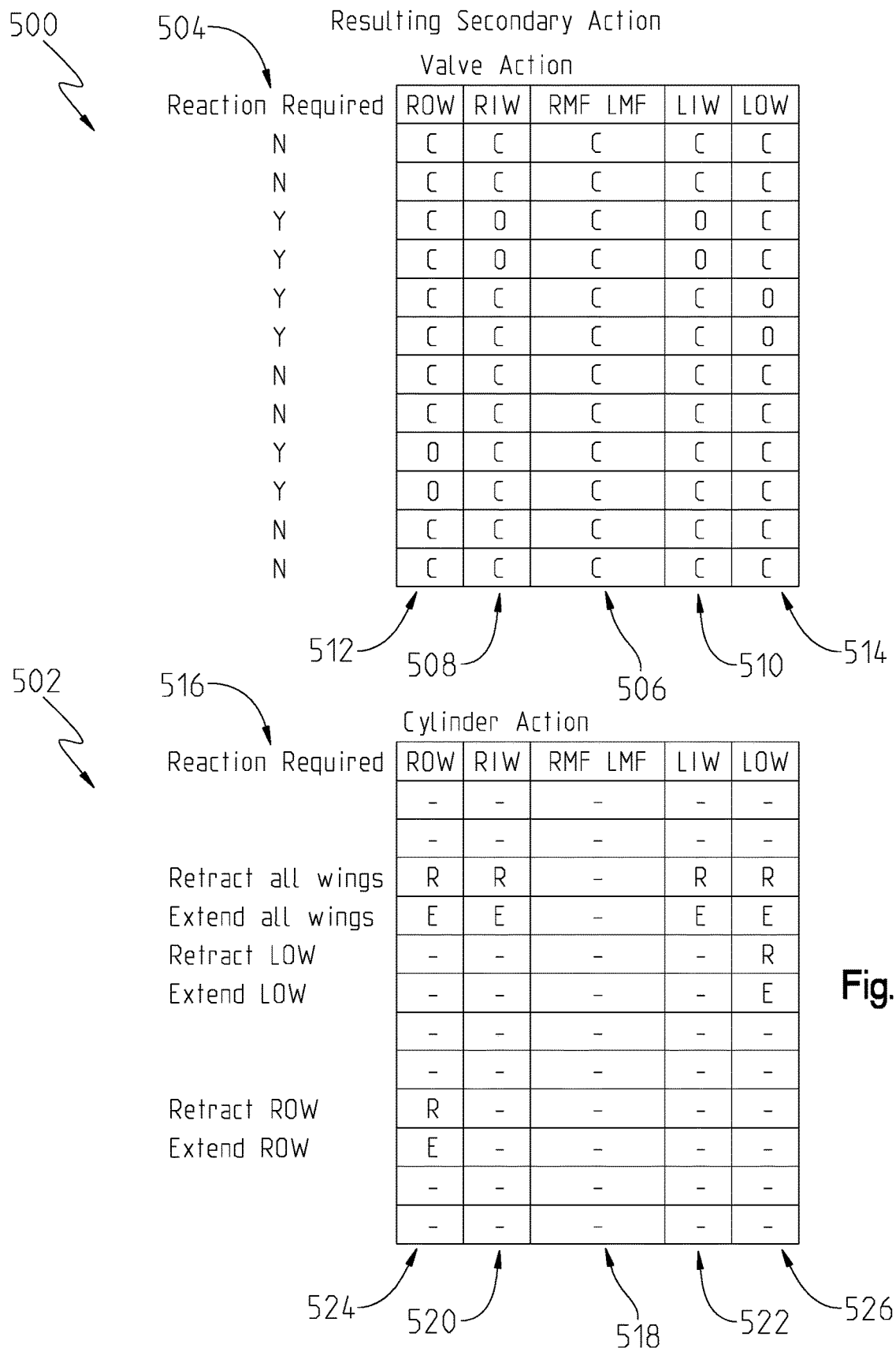
FIG. 5 is a chart of valve and cylinder secondary response for tool depth control.

Before turning to FIGS. 4 and 5, however, the hydraulic control system 300 of FIG. 3 includes a plurality of nodes or manifolds. As previously described, the first node 314 is an intersection point of the first and second flow paths. A second node 316 may be disposed in the first fluid path 308 downstream of the first control valve 220. Here, the first flow path 308 separates into two flow paths so that fluid can be supplied to the first actuator 122 along one path and the second actuator 124 along a second path.

A third node is another intersection point of the first and second flow paths, but it is located downstream of the second control valve 224. Here, fluid may pass through the third node 318 and to the third actuator 132. A fourth node 320 is an intersection point of the first and second fluid paths, but it is located downstream of the third control valve 228 and upstream from the fourth actuator 138. A fifth node 322 is another intersection point of the first and second flow paths, but it is located downstream of the fourth control valve 232 and upstream from the fifth actuator 144. Lastly, a sixth node 324 provides a further intersection point of the first and second flow paths, but it is located downstream from the fifth control valve 236 and upstream of the sixth actuator 150. In the illustrated embodiment, each of the third, fourth, fifth and sixth nodes are located between a different control valve and a different actuator. Unlike the first and second nodes, however, fluid may only flow through either the first or second flow path when passing through each of the third, fourth, fifth and sixth nodes due to the ECU selectively opening or closing the different control valves.

Referring to FIG. 4, control logic for controlling the implement is provided. Here, the logic includes a primary control valve response table 400 and a primary actuator or cylinder response table 402. In the valve response table 400, there are rows that refer to a type of response commanded by an operator such as raise or lower the overall implement frame (e.g., "Raise Overall"), raise or lower the main frame 102 (e.g., "Raise MF"), raise or lower the first inner frame 104 (e.g., "Raise LIW"), raise or lower the second inner frame 106 (e.g., "Raise RIW"), raise or lower the first outer frame 108 (e.g., "Raise LOW"), and raise or lower the second outer frame 110 (e.g., "Raise ROW"). In this table, "R" refers to right and "L" refers to left when looking at the implement from its front rearward. Moreover, "I" refers to inner and "O" refers to outer.

The other rows in the valve response table 400 indicate the different frame sections of the implement. Here, "RMF" and "LMF" refer to right main frame and left main frame, respectively. In FIG. 1, this is simply the main frame 102. "LIW" and "RIW" refer to left inner wing and right inner wing, respectively. The left inner wing is the first inner frame 104 and the right inner wing is the second inner frame 106 as shown in FIG. 1. Further, "LOW" and "ROW" refer to left outer wing and right outer wing, respectively, which corresponds with the first outer frame 108 and the second outer frame 110, respectively. In this table 400, the response of each control valve is illustrated as either being in its open position "O" or closed position "C".

For purposes of table 400, the first control valve 220 has a response indicated with reference number 404, the second control valve 224 has a response indicated as reference number 408, the third control valve 228 has a response indicated as reference number 406, the fourth control valve 232 has a response indicated as reference number 412, and the fifth control valve 236 has a response indicated as reference number 410.

In the primary actuator or cylinder table 402, the rows and columns are similar to those in table 400. Here, however, the actuator is being characterized as either being in its extended position "E" or its retracted position "R". In the event the actuator is not actuated, then neither an "E" or an "R" appears in the respective box. The response of the first and second actuators is represented by reference number 414. The response of the third actuator 132 is represented by reference number 418, the response of the fourth actuator 138 is represented by reference number 416, the response of the fifth actuator 144 is represented by reference number 422, and the response of the sixth actuator 150 is represented by reference number 420 in FIG. 4.

Referring to FIG. 5, the control logic for controlling the implement may also include a secondary control valve response table 500 and a secondary actuator or cylinder response table 502. In the secondary valve response table 500, a first column 504 provides for different responses or reactions required of the different control valves. Here, if a secondary response is required, the column 504 illustrates a "Y", and if no secondary response is required then the column 504 is shown with a "N". This will be further described below.

For purposes of table 500, the first control valve 220 has a response indicated with reference number 506, the second control valve 224 has a response indicated as reference number 510, the third control valve 228 has a response indicated as reference number 508, the fourth control valve 232 has a response indicated as reference number 514, and the fifth control valve 236 has a response indicated as reference number 512.

In the secondary actuator or cylinder table 502, the rows and columns are similar to those in table 500. A first column 516 provides for different responses or reactions required of the different actuators or cylinders. If no response is required, then the row is left blank under column 516. If, however, a response is required, then the type of response is provided. As is similar to table 402, each actuator is being characterized as either being in its extended position "E" or its retracted position "R" in table 502. In the event the actuator is not actuated, then neither an "E" or an "R" appears in the respective box. The response of the first and second actuators is represented by reference number 518. The response of the third actuator 132 is represented by reference number 522, the response of the fourth actuator 138 is represented by reference number 520, the response of the fifth actuator 144 is represented by reference number 526, and the response of the sixth actuator 150 is represented by reference number 524 in FIG. 5.

Since the hydraulic control system 300 of FIG. 3 is a hybrid parallel-series control, hydraulic fluid flows through the system 300 from the innermost frame section (e.g., the main frame 102) to the outermost frame section (e.g., the first outer frame 108 or the second outer frame 110). Since the third flow path or return line 312 is only fluidly coupled to the first and second outer frames, the fluid can flow through the first flow path 308 or second flow path 310 until it works its way into the return line 312 and returns to the fluid reservoir 304. As will be described, the control system 300 may require two responses when independently actuating the third or fourth actuator and raising or lowering either the first inner or second inner frame. This is because as fluid is provided to the third actuator 132, for example, to raise or lower the first inner frame 104, the resulting raising or lowering movement of the first inner frame 104 induces a similar raising or lowering movement of the first outer frame 108 as well. Fluid that is used to actuate the third actuator 132 then flows to the fifth actuator 144, and the fifth actuator 144 is actuated to allow the fluid to be returned to the fluid reservoir via the third fluid path 312. Controlling the fifth actuator 144 therefore results in a secondary action or response to enable the entire frame to be balanced out and controlled at approximately the same height (or same tool depth).

The ECU 212 may have the control logic of FIGS. 4 and 5 stored in a memory unit thereof. A processor of the ECU 212 may then execute the control logic as commanded by the operator. This logic may also be part of a software program or algorithm used by the ECU 212 when controlling the frame height of the implement.

As described above, when the operator desires to raise or lower the entire frame or only the main frame 102, then there is no interaction by the ECU 212 to control the control valves. This is the case when the first control valve 220 is normally or biased in its open position, and the other control valves are biased in their normally closed position. If, however, in a different embodiment the first control valve 220 is a normally closed valve, then the ECU 212 would intervene and electronically control the valve 220 to its open position.

In the primary valve table 400 of FIG. 4, it is shown that a command to raise or lower the entire frame requires the first control valve response 404 to be open "O" and the other control valves to be closed "C". The same is true if the ECU 212 receives an instruction to raise or lower the main frame 102. Again, the first control valve response 404 is to be open and the other control valve responses are closed. Moreover, with respect to the cylinder response table 402, whenever the entire frame or a frame section is controlled in a raised movement, the respective actuator or actuators are controlled to their extended position, and if a lowering instruction is received then the actuator or actuators are controlled to their retracted positions. This is clearly shown in table 402 of FIG. 4 where the responses of all six actuators is to extend when raising the entire frame and all six actuators retract when lowering the entire frame.

The same is true whenever a single frame section is raised or lowered. For example, when the first outer frame 108 is raised, the corresponding actuator response 422 is to extend.

As shown in table 402, when the first outer frame 108 is lowered, the corresponding actuator response 422 is to retract.

Example 1

In a first example of the present disclosure, the operator sets a target depth for the plurality of tools coupled to each frame section of the implement to 3 inches. During operation, the first sensor 216 and second sensor 218 detect the main frame 102 is at a depth of 3.5 inches. Upon communicating this to the ECU 212, the ECU 212 may compare the detected depth to the target depth. In some instances, a threshold may be established such that the detected depth has to be greater than a threshold amount different from the target depth before the ECU 212 takes any corrective action. For this example, suppose the threshold is 0.25 inches and thus the detected depth of 3.5 inches exceeds the threshold amount.

In order to adjust the main frame 102 and raise it from 3.5 inches to the target depth of 3.0 inches, the ECU 212 may be programmed based on the logic of FIGS. 4 and 5. Here, in table 400 the first control valve 220 needs to be in its open position and the other control valves in their closed position. As described above, the first control valve 220 is normally open and the other control valves are normally closed. Thus, there is no required action on behalf of the ECU 212 other than monitor the first and second sensors until the first actuator 122 and second actuator 124 are actuated to their extended positions to raise the main frame 102. As shown in table 402, the other actuators are also actuated to their extended positions when raising the main frame 102.

Once the main frame 102 is raised to the target depth of 3 inches, the ECU 212 receives communications from the other sensors indicating that both inner frames and both outer frames have also been raised by 0.5 inches to 2.5 inches. Thus, corrective action is required. This is further shown in FIG. 5 in column 504 where it indicates a corrective response is required. According to table 502, the corrective response is to close the first control valve 220. In addition, the second control valve 224 and third control valve 228 may be opened to allow the third actuator 132 and fourth actuator 138 to be actuated to lower the first and second inner frames. As described above, with the parallel hydraulic control, by lowering the first inner frame 104 a resulting action is the first outer frame 108 also lowers by approximately the same amount. Moreover, by lowering the second inner frame 106, the second outer frame 110 also lowers by approximately the same amount. Thus, each frame section is operably controlled to the target depth.

Example 2

In a second example, the operator may set the target depth to 3 inches again. During operation, the ECU receives a signal from the fifth sensor 230 indicating that the first outer frame 108 is detected at 2.5 inches deep. If the threshold is 0.25 inches, the detected depth exceeds the threshold and is not at the target depth. Thus, the ECU 212 can operably control the hydraulic fluid from the fluid source 302 through the second flow path 310 and to the fourth control valve 232. Moreover, based on table 402, to lower the first outer frame 108 the appropriate valve response 412 is close the first control valve, maintain the second control valve 224, the third control valve 228, and the fifth control valve 236 in their closed positions, and open the fourth control valve 232. According to table 402, the fifth actuator 144 is actuated to its retracted position to operably control a lowering movement of the first outer frame 108 to the target depth. Once the first outer frame 108 reaches the target depth, the hydraulic fluid can return via the third flow path 312 to the fluid reservoir 304. In addition, as shown in tables 500 and 502, there is no secondary corrective action required. In this example, each of the five frame sections should be set at the target depth.

Example 3

In a third example, the operator commands a target depth of 3 inches with a threshold amount of 0.25 inches. In this example, suppose the ECU receives a signal from the fourth sensor 226 indicating that the first inner frame 106 is at a depth of 3.5 inches. Since the detected depth is not at the target depth of 3 inches, and it is outside of the threshold range of 0.25 inches, the ECU 212 can execute the logic set forth in tables 400, 402, 500, and 502 to raise the second inner frame 106 by 0.5 inches.

According to table 400, to raise the second inner frame 106 requires a primary valve response 406 of closing the first control valve 220, opening the third control valve 228, and maintaining the other control valves in their closed positions. By doing so, hydraulic fluid cannot flow through the first control valve 220 via the first flow path, and instead flows through the second flow path 310. Fluid passes through the third control valve 228 and the fourth actuator 138 may be actuated to its extended position as shown in table 402.

As the second inner frame 106 is raised to the target depth of 3 inches, table 502 indicates a secondary corrective action is necessary. In this case, by raising the second inner frame 106 by 0.5 inches, the second outer frame 110 is also raised by 0.5 inches to 3.5 inches. Again, this detected depth is not the target depth and exceeds the threshold range of 0.25 inches. As such, the ECU 212 takes corrective action to lower the second outer frame 110. As shown in table 500, the corresponding response is to maintain the first control valve 220, the second control valve 224, and the fourth control valve 232 in their closed positions. In addition, the ECU 212 operably controls the third control valve 228 from its open position to its closed position, and operably controls the fifth control valve 236 from its closed position to its open position. This allows fluid to flow through the fifth control valve 236 and to the sixth actuator 150. The sixth actuator can be actuated to lower the second outer frame 110 to the target depth of 3 inches, and fluid can be returned to the fluid reservoir 304 via the third fluid path 312.

The above examples are provided only to illustrate how the ECU 212 may be programmed to control the different control valves and actuators for moving the entire frame and each frame section as commanded by the operator. It should be appreciated that in other embodiments, and as described above, one or more of the control valves may be biased in a different position than as shown and described above. As such, the ECU 212 may be programmed accordingly to raise or lower the frame or frame sections utilizing the parallel-series hydraulic control system as described herein.

Figure 6:
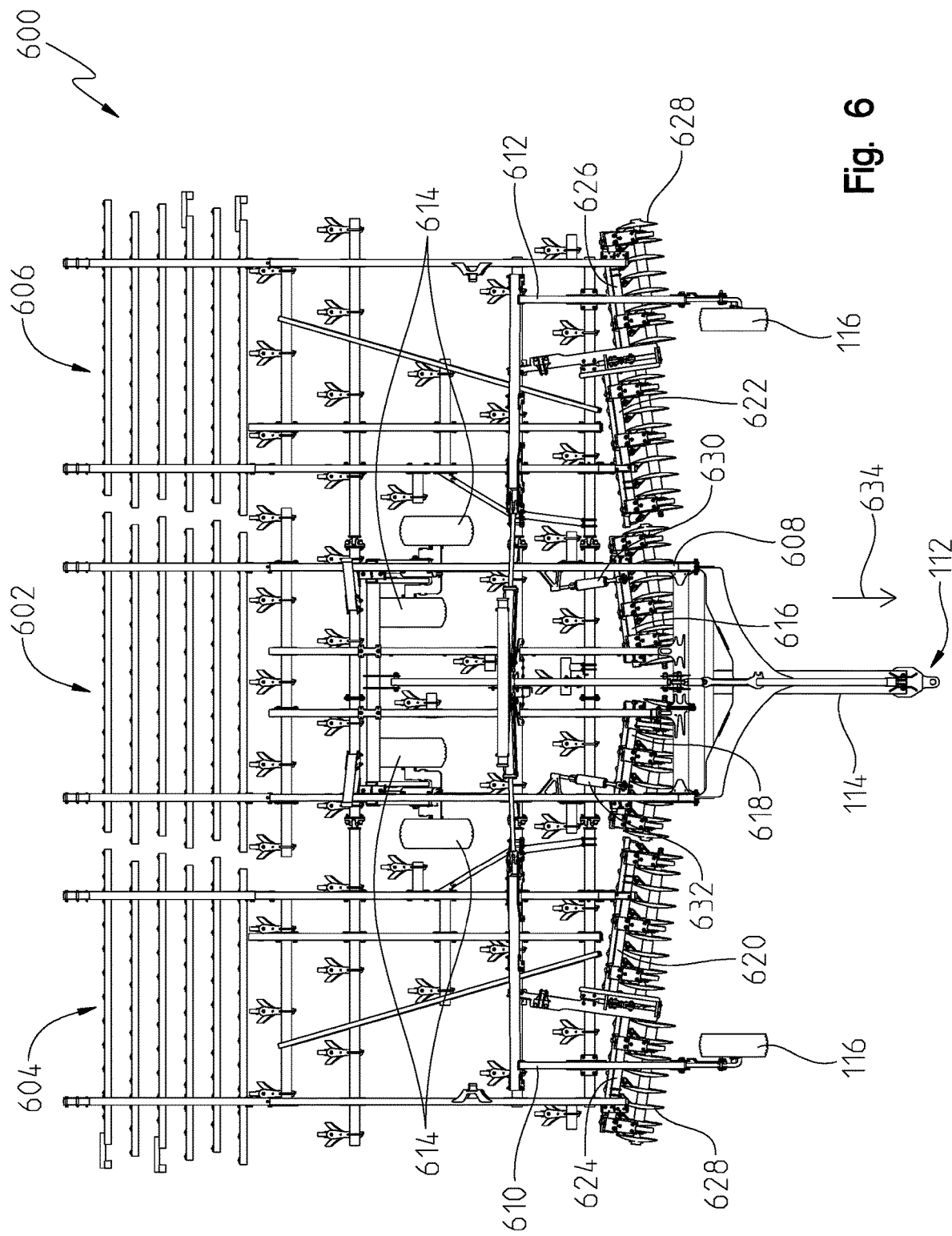
FIG. 6 is an elevated view of another agricultural implement.

Referring to FIG. 6, a different embodiment of an agricultural implement 600 is shown. In this embodiment, reference numbers previously described above and shown in FIGS. 1-5 refer to the same features in FIG. 6. This implement 600 is capable of performing a cultivating operation, although the use or function of the implement is not limiting to this embodiment. The implement is shown being formed by a multiple sections or frame. For instance, a first or centrally located frame 602 is positioned towards the middle of the implement 600. A second frame 604 and a third frame 606 are disposed on opposite sides of the main frame 602. Although only three frame sections are shown in FIG. 6, other embodiments may include more than three sections. Alternatively, one or two frame sections are also possible.

Similar to the previously described embodiments, the first frame section 602 includes one or more frame members 608 that form the entire section 602. Likewise, the second frame section 604 includes one or more frame members 610, and the third frame section 606 includes one or more frame 612. In at least one embodiment, front wheels 116 and rear wheels 614 may be coupled to the frame members.

In the embodiment of FIG. 6, work tools 628 are provided for performing a work function (e.g., the cultivating operation). For purposes of this disclosure, any type of work tool may be used for performing a desired function. In this embodiment, there are a plurality of tools 628 provided for performing the work function. In a different embodiment, there may only be one work tool depending upon the type of work function being executed. Here, the plurality of work tools 628 are coupled to a sub-frame, and the sub-frame is coupled to one of the frame members of either the first frame 602, the second frame 604, or the third frame 606.

In FIG. 6, a first sub-frame 616, a second sub-frame 618, a third sub-frame 620, a fourth sub-frame 620, a fifth sub-frame 620, and a sixth sub-frame 620 are shown. There may be any number of sub-frames in other embodiments. Moreover, each sub-frame may be coupled at a location below the main frame. For purposes of this embodiment, the first frame section 602, the second frame section 604, and the third frame section 606 may be collectively referred to as a main frame. Thus, the plurality of tools 628 are coupled to one of the sub-frames beneath the main frame.

Each sub-frame may be pivotally coupled to the main frame via an actuator. As such, the respective sub-frame may be pivoted with respect to the main frame. In FIG. 6, the first sub-frame 616 is pivotally controlled and coupled to the first frame section 602 by a first actuator 630. Similarly, the second sub-frame 618 may be pivotally controlled and coupled to the first frame section 602 by a second actuator 630. Although not shown, the third sub-frame 620 and fifth sub-frame 624 may each be coupled by an independent actuator to the second frame section 604. Similarly, and also not shown, the fourth sub-frame 622 and the sixth sub-frame 626 may each be coupled by an independent actuator to the third frame section 606.

Each of the aforementioned actuators may be a hydraulic actuator that functions similarly to those described above and shown in FIGS. 1-3. Alternatively, other types of actuators may be used such as electric actuators, mechanical actuators, and any other known type of actuator. In the embodiment of FIG. 6, each actuator is a hydraulic actuator controlled by hydraulic fluid. Moreover, each actuator includes a cylinder (not shown) having a first end coupled to the main frame (e.g., the respective frame section 602, 604, 606) with a rod (not shown) or other member that telescopically moves with respect to the cylinder based on hydraulic pressure within the cylinder. The rod or other member may be coupled to the respective sub-frame to allow pivotal movement of the sub-frame with respect to the main frame. The sub-frame can pivot with respect to the main frame as the actuator is controlled between its extended and retracted positions.

As the sub-frame pivots with respect to the main frame, the angle of each of the plurality of tools 628 coupled to the sub-frame changes with respect to a direction of travel identified by arrow 634 in FIG. 6. The implement 600 may be driven along the direction of travel 634 by a machine or tractor, as described above. In one example, the angle of each tool 628 may be changed by 60° or less. In another example, the angle may be changed by 30° or less. In a further example, the angle may be changed by 10° or less with respect to the direction of travel 634. In yet a further example, the angle of each tool 628 may be varied between 0-10° with respect to the direction of travel 634. Other angles of variation are further contemplated in this disclosure, and may depend on the type of implement, tool, or work function.

The variable angle setting of each sub-frame may be controlled by the ECU 212. This may be controlled hydraulically according to the embodiment shown in FIG. 3. Here, each sub-frame may be coupled to the main frame (e.g., the first frame section 602, the second frame section 604, and third frame section 606) via an actuator. Hydraulic fluid can be controlled to the different actuators in either a series or parallel control. Thus, the variable angle control setting is handled in a manner similar to the depth control setting as previously described.

For sake of clarity, fluid flow may be directed to a control valve similar to that of the first control valve 220. If the ECU 212 controls the control valve to its open position, hydraulic fluid can flow in a series path to each actuator for adjusting the angle of each sub-frame relative to the main frame. If, however, the ECU 212 only wants to control the angle setting of one sub-frame, the ECU 212 may close the control valve and open a different control similar to the other control valves (224, 228, 232, 236) described above. As such, a parallel flow path is formed to enable hydraulic fluid to flow to the actuator that controls pivotal movement of the desired sub-frame. A secondary corrective action, similar to that described in Example 3 above, may also be required and achieved according to the same teachings and principles above. In addition, any of the control valves in this embodiment may be normally open or closed, and the same principles apply for achieving series-parallel hydraulic control of the implement.

Thus, the angle of any one sub-frame may be hydraulically controlled via parallel control to a desired setting with respect to the direction of travel 634. Moreover, all of the sub-frames can be angularly varied with respect to the main frame via series control, as described above.

In a further embodiment, the depth in which a tool or plurality of tools 628 coupled to a sub-frame may be controllably varied with respect to a ground surface. In this embodiment, the sub-frame may be coupled to a rock shaft that rotates or pivots in a substantially vertical direction. The rock shaft may also be coupled to one end of an actuator, whereas the opposite end of the actuator is coupled to the main frame. In this embodiment, the cylinder of the actuator is coupled to the main frame, and the cylinder rod is coupled to the rock shaft. As the cylinder rod extends and retracts with respect to the cylinder, the rock shaft is rotated. As the rock shaft rotates, the sub-frame moves up or down to change the depth in which the tool or plurality of tools 628 penetrates into the underlying ground surface.

Similar to the previously described embodiments, the ECU 212 can control a position of a control valve between an open and closed position. In the open position, hydraulic fluid can flow through a first flow path through the control valve to provide a series hydraulic control. The series hydraulic control allows hydraulic fluid to flow to each of a plurality of actuators for operably adjusting the depth of tools 628 coupled to different sub-frames. In FIG. 6, for example, hydraulic fluid can flow to the first actuator 630 and second actuator 632 in series so that the plurality of tools 628 mounted to the first sub-frame 616 and second sub-frame 618 may be controllably adjusted to different depths. In FIG. 6, the aforementioned rock shafts are not shown, but in this embodiment, a rock shaft would be coupled between the first actuator 630 and the first sub-frame 616, and a different rock shaft would be coupled between the second actuator 632 and the second sub-frame 618. A similar arrangement may be provided with respect to the third sub-frame 620, the fourth sub-frame 622, the fifth sub-frame 624, and the sixth sub-frame 626.

If, however, only one of the sub-frames needs to be adjusted to meet a desired tool depth, then parallel control may be used to achieve the desired depth. Here, the control valve may be closed so that hydraulic fluid does not pass therethrough. With the valve closed, fluid may flow through a parallel flow path similar to that shown in FIG. 3 and identified as the second flow path 310. The ECU 212 may operably control a different control valve so that fluid may flow through that particular control valve and to the actuator that is able to adjust the height of the respective sub-frame. In FIG. 6, for example, an actuator (not shown) may receive hydraulic fluid through the parallel flow path so that the third sub-frame 620, the fourth sub-frame 622, the fifth sub-frame 624, or the sixth sub-frame 626 may be adjusted. As also described, depending upon which sub-frame is adjusted, a secondary corrective action may be required in a similar manner as described above.

In an embodiment similar to the previous one, a tool or plurality of tools may be coupled directly to the rock shaft. In this embodiment, there may not be a sub-frame, but the tool or plurality of tools may be operably controlled in a similar manner as previously described.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural implement, comprising:
    a transversely extending frame forming at least a first section, a second section, and a third section, where the first section is disposed between and pivotally coupled to the second and third sections;
    a fluid source for providing hydraulic fluid;
    a plurality of tools operably coupled to each of the first section, the second section, and the third section, wherein each of the plurality of tools is configured to penetrate an underlying soil upon which the implement travels;
    an electronic control unit coupled to the frame;
    a plurality of sensors including at least a first sensor coupled to the first section, a second sensor coupled to the second section, and a third sensor coupled to the third section;
    a plurality of actuators operably coupled to each of the first, second and third sections; and
    a plurality of control valves operably controllable between an open and a closed position; wherein, each of the plurality of sensors is configured to detect a depth of penetration of at least one of the plurality of tools coupled to a respective section of the frame and communicate the detected depth to the electronic control unit;
    wherein, the electronic control unit compares the detected depth to a target depth and operably controls the position of each of the plurality of control valves until the depth of the plurality of tools on each section of the frame is at the target depth.

2. The agricultural implement of claim 1, wherein the plurality of actuators comprises a first actuator and a second actuator coupled to the first section, a third actuator coupled to the second section, and a fourth actuator coupled to the third section.

3. The agricultural implement of claim 2, wherein the plurality of control valves comprises:
    a first control valve operably controllable between an open position and a closed position, the first control valve being fluidly coupled between the fluid source and the first and second actuators;
    a second control valve operably controllable between an open position and a closed position, the second control valve being fluidly coupled to the third actuator in its open position; and
    a third control valve operably controllable between an open position and a closed position, the third control valve being fluidly coupled to the fourth actuator in its open position.

4. The agricultural implement of claim 3, further comprising:
    a first flow path defined between the fluid source and the third and fourth actuators, the first flow path fluidly coupling the first actuator, the second actuator, the third actuator, and the fourth actuator in series with one another when the first control valve is in its open position, the second control valve is in its closed position, and the third control valve is in its closed position; and
    a second flow path defined between the fluid source and the third and fourth actuators, the second flow path fluidly coupling at least the third and fourth actuators in parallel with one another when the first control valve is in its closed position, and either the second control valve or the third control valve is in its open position.

5. The agricultural implement of claim 4, wherein the hydraulic control system comprises:
    a first node fluidly coupling the first and second flow paths to one another;
    a second node fluidly coupling the first control valve, the first actuator and the second actuator to one another;
    a third node fluidly coupling the first fluid path, the second fluid path, the second control valve and the third actuator to one another; and
    a fourth node fluidly coupling the first fluid path, the second fluid path, the third control valve, and the fourth actuator to one another.

6. The agricultural implement of claim 4, wherein, when the depth of the plurality of tools coupled to the second section or the third section is not at the target depth, the electronic control unit operably controls fluid flow through the third or fourth actuator via the second flow path until the depth is detected at the target depth.

7. The agricultural implement of claim 2, further comprising:
    a first sub-frame coupled to and positioned below the first section, where the first actuator is coupled between the first section and the first sub-frame;

a second sub-frame coupled to and positioned below the first section, where the second actuator is coupled between the first section and the second sub-frame;

a third sub-frame coupled to and positioned below the second section, where the third actuator is coupled between the second section and the third sub-frame;

a fourth sub-frame coupled to and positioned below the third section, where the fourth actuator is coupled between the third section and the fourth sub-frame;

a second plurality of tools coupled to each of the first, second, third, and fourth sub-frames;

wherein:

actuation of the first actuator operably pivots the first sub-frame relative to the first section for adjusting an angle of the second plurality of tools coupled to the first sub-frame;

actuation of the second actuator operably pivots the second sub-frame relative to the first section for adjusting an angle of the second plurality of tools coupled to the second sub-frame;

actuation of the third actuator operably pivots the third sub-frame relative to the second section; and actuation of the fourth actuator operably pivots the fourth sub-frame relative to the third section.

8. The agricultural implement of claim 2, further comprising:

a first sub-frame coupled to and positioned below the first section, where the first actuator is coupled between the first section and the first sub-frame;

a second sub-frame coupled to and positioned below the first section, where the second actuator is coupled between the first section and the second sub-frame;

a third sub-frame coupled to and positioned below the second section, where the third actuator is coupled between the second section and the third sub-frame;

a fourth sub-frame coupled to and positioned below the third section, where the fourth actuator is coupled between the third section and the fourth sub-frame;

a plurality of tools coupled to each of the first, second, third, and fourth sub-frames;

wherein:

actuation of the first actuator operably moves the first sub-frame relative to the first section for adjusting a depth of the plurality of tools coupled to the first sub-frame;

actuation of the second actuator operably moves the second sub-frame relative to the first section for adjusting a depth of the plurality of tools coupled to the second sub-frame;

actuation of the third actuator operably moves the third sub-frame relative to the second section for adjusting a depth of the plurality of tools coupled to the third sub-frame; and actuation of the fourth actuator operably moves the fourth sub-frame relative to the third section for adjusting a depth of the plurality of tools coupled to the fourth sub-frame.

9. The agricultural implement of claim 2, further comprising:

a fluid reservoir; and a third flow path fluidly coupling the third actuator and the fourth actuator to the fluid reservoir.

10. An agricultural implement, comprising:

a transversely extending frame forming at least a first section, a second section, a third section, a fourth section, and a fifth section, where the first section is pivotally coupled between the second and third sections, the second section is pivotally coupled between the first and fourth sections, and the third section is pivotally coupled between the first and fifth sections;

a fluid source for providing hydraulic fluid;

a plurality of tools operably coupled to each of the first section, the second section, the third section, the fourth section, and the fifth section, wherein each of the plurality of tools is configured to penetrate an underlying soil upon which the implement travels;

an electronic control unit coupled to the frame;

a plurality of sensors including at least a first sensor coupled to the first section, a second sensor coupled to the second section, a third sensor coupled to the third section, a fourth sensor coupled to the fourth section, and a fifth sensor coupled to the fifth section;

a plurality of actuators operably coupled to each of the first, second, third, fourth and fifth sections; and a plurality of control valves operably controllable between an open and a closed position; wherein, each of the plurality of sensors is configured to detect a depth of penetration of at least one of the plurality of tools coupled to a respective section of the frame and communicate the detected depth to the electronic control unit;

wherein, the electronic control unit compares the detected depth to a target depth and operably controls the position of each of the plurality of control valves until the depth of the plurality of tools on each section of the frame is at the target depth.

11. The agricultural implement of claim 10, wherein the target depth comprises a first target depth of the first section, a second target depth of the second section, a third target depth of the third section, a fourth target depth of the fourth section, and a fifth target depth of the fifth section, wherein at least one of the first, second, third, fourth, and fifth target depths is the same as another of the first, second, third, fourth, and fifth target depths.

12. The agricultural implement of claim 11, wherein at least one of the first, second, third, fourth, and fifth target depths is different from another of the first, second, third, fourth, and fifth target depths.

13. The agricultural implement of claim 10, wherein the plurality of actuators comprises a first actuator and a second actuator coupled to the first section, a third actuator coupled to the second section, a fourth actuator coupled to the third section, a fifth actuator coupled to the fourth section, and a sixth actuator coupled to the fifth section.

14. The agricultural implement of claim 13, wherein the plurality of control valves comprises:

a first control valve operably controllable between an open position and a closed position, the first control valve being fluidly coupled between the fluid source and the first and second actuators;

a second control valve operably controllable between an open position and a closed position, the second control valve being fluidly coupled to the third actuator in its open position;

a third control valve operably controllable between an open position and a closed position, the third control valve being fluidly coupled to the fourth actuator in its open position;

a fourth control valve operably controllable between an open position and a closed position, the fourth control valve being fluidly coupled to the fifth actuator in its open position; and a fifth control valve operably controllable between an open position and a closed position, the fifth control valve being fluidly coupled to the sixth actuator in its open position.

15. The agricultural implement of claim 14, further comprising:
a first flow path fluidly coupling the first, second, third, fourth, fifth, and sixth actuators in series with one another when only the first control valve is in its open position; and
a second flow path fluidly coupling the third, fourth, fifth, and sixth actuators in parallel with one another when the first control valve is in its closed position.

16. The agricultural implement of claim 14, further comprising:
a first flow path defined between the fluid source and the fifth and sixth actuators, the first flow path fluidly coupling the first, second, third, fourth, fifth, and sixth actuators in series with one another when only the first control valve is in its open position; and
a second flow path defined between the fluid source and the fifth and sixth actuators, the second flow path fluidly coupling at least the third, fourth, fifth, and sixth actuators in parallel with one another when the first control valve is in its closed position.

17. The agricultural implement of claim 16, further comprising:
a fluid reservoir; and
a third flow path fluidly coupling the third actuator and the fourth actuator to the fluid reservoir.

18. The agricultural implement of claim 13, wherein, when the depth of the plurality of tools coupled to the second section, the third section, the fourth section, or the fourth section is not at the target depth, the electronic control unit operably controls fluid flow through the third, fourth, fifth, or sixth actuator via the second flow path until the depth is detected at the target depth.

* * * * *